(12) United States Patent
Lee et al.

(10) Patent No.: US 10,396,400 B2
(45) Date of Patent: Aug. 27, 2019

(54) ELECTROLYTE FOR LITHIUM BATTERY AND LITHIUM BATTERY INCLUDING THE ELECTROLYTE

(71) Applicant: SAMSUNG SDI CO., LTD., Yongin-si, Gyeonggi-do (KR)

(72) Inventors: Minju Lee, Yongin-si (KR); Woocheol Shin, Yongin-si (KR); Seungtae Lee, Yongin-si (KR); Vladimir Egorov, Yongin-si (KR); Soojin Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/679,260

(22) Filed: Aug. 17, 2017

(65) Prior Publication Data

US 2018/0090788 A1 Mar. 29, 2018

Related U.S. Application Data

(62) Division of application No. 14/805,934, filed on Jul. 22, 2015.

(30) Foreign Application Priority Data

Nov. 14, 2014 (KR) ........................ 10-2014-0158904

(51) Int. Cl.
*H01M 10/0567* (2010.01)
*H01M 10/0569* (2010.01)
(Continued)

(52) U.S. Cl.
CPC ..... *H01M 10/0567* (2013.01); *H01M 10/052* (2013.01); *H01M 10/0564* (2013.01);
(Continued)

(58) Field of Classification Search
CPC ......... H01M 10/0567; H01M 10/0564; H01M 10/0569; H01M 2300/0037
(Continued)

(56) References Cited

U.S. PATENT DOCUMENTS 3,475,371 A 10/1969 Stewart et al.
2002/0076619 A1* 6/2002 Yamada .............. H01M 10/052
429/324

(Continued)

FOREIGN PATENT DOCUMENTS

JP 2008-171766 A 7/2008
JP 2010-232117 A 10/2010
KR 10-2014-0020328 A 2/2014

*Primary Examiner* — Basia A Ridley
*Assistant Examiner* — James M Erwin
(74) *Attorney, Agent, or Firm* — Lee & Morse, P.C.

(57) ABSTRACT

An electrolyte for a lithium battery includes an organic solvent; and a compound represented by Formula 1:

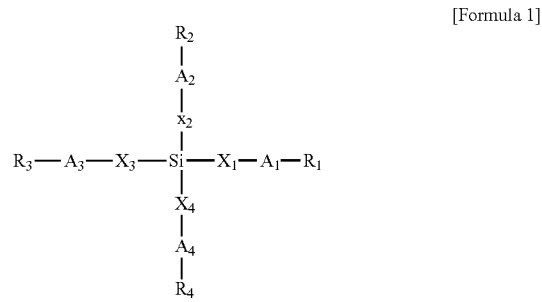

[Formula 1]

wherein, in Formula 1, $X_1$ to $X_4$, $A_1$ to $A_4$, and $R_1$ to $R_4$ are further defined in the specification.

20 Claims, 6 Drawing Sheets

(51) Int. Cl.
  *H01M 10/0564*   (2010.01)
  *H01M 10/052*   (2010.01)
(52) U.S. Cl.
  CPC ............... *H01M 10/0569* (2013.01); *H01M 2300/0037* (2013.01); *Y02T 10/7011* (2013.01)
(58) Field of Classification Search
  USPC ........................................................ 429/332
  See application file for complete search history.

(56)  References Cited

U.S. PATENT DOCUMENTS

| | | |
|---|---|---|
| 2010/0248036 A1 | 9/2010 | Okumurai et al. |
| 2012/0315536 A1 | 12/2012 | Brat et al. |
| 2013/0250485 A1 | 9/2013 | Kaye et al. |
| 2014/0087249 A1 | 3/2014 | Azami |

\* cited by examiner

ELECTROLYTE FOR LITHIUM BATTERY AND LITHIUM BATTERY INCLUDING THE ELECTROLYTE

CROSS-REFERENCE TO RELATED APPLICATIONS

This is a divisional application based on pending application Ser. No. 14/805,934, filed Jul. 22, 2015, the entire contents of which is hereby incorporated by reference.

Korean Patent Application No. 10-2014-0158904, filed on Nov. 14, 2014, in the Korean Intellectual Property Office, and entitled: "Electrolyte For Lithium Battery and Lithium Battery Including The Electrolyte," is incorporated by reference herein in its entirety.

BACKGROUND

1. Field

Embodiments relate to an electrolyte for a lithium battery and a lithium battery including the electrolyte.

2. Description of the Related Art

Lithium secondary batteries produce electric energy by oxidation and reduction when lithium ions are intercalated/deintercalated at a cathode and an anode, which each include an active material capable of intercalation and deintercalation of lithium ions. A space between the cathode and the anode is filled with an organic electrolyte solution or a polymer electrolyte solution.

SUMMARY

Embodiments are directed to an electrolyte for a lithium battery including an organic solvent and a compound represented by Formula 1:

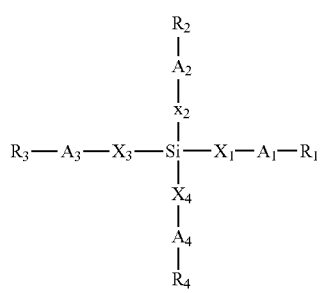

[Formula 1]

wherein, in Formula 1, $X_1$ to $X_4$ are each independently oxygen (O) or nitrogen (N), $A_1$ to $A_4$ each independently denote a chemical bond, an unsubstituted or substituted C1-C10 alkylene group, an unsubstituted or substituted C6-C10 arylene group, an unsubstituted or substituted C7-C10 arylalkylene group, an unsubstituted or substituted C2-C10 heteroarylene group, an unsubstituted or substituted C3-C10 heteroarylalkylene group, or an unsubstituted or substituted C4-C10 carbocyclic group, at least one of $R_1$ to $R_4$ is $-C(R_5)=Y_1$, where $Y_1$ is $C(R_6)(R_7)$ or oxygen (O), and $R_5$ to $R_7$ are each independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom, and the remaining $R_1$ to $R_4$ are each independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom.

$X_1$ to $X_4$ may all be oxygen (O).

The compound represented by Formula 1 may be a compound represented by Formula 2 or a compound represented by Formula 3:

[Formula 2]

wherein, in Formula 2, a is independently from 1 to 4, and $R_5$ to $R_7$ are each independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom,

[Formula 3]

wherein, in Formula 3, $R_5$ is independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom.

The compound represented by Formula 1 may be selected from compounds represented by Formulae 4 to 9:

[Formula 4]

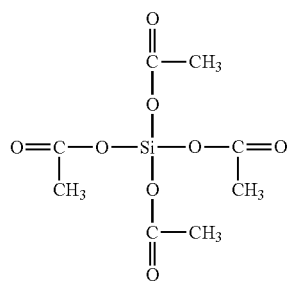

[Formula 5]

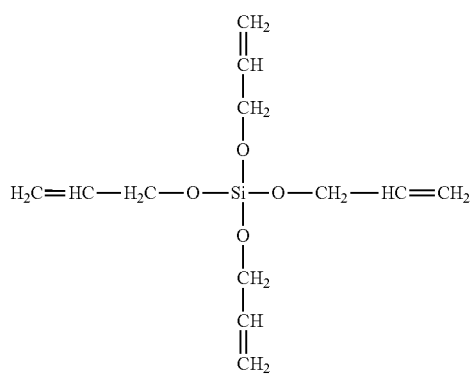

[Formula 6]

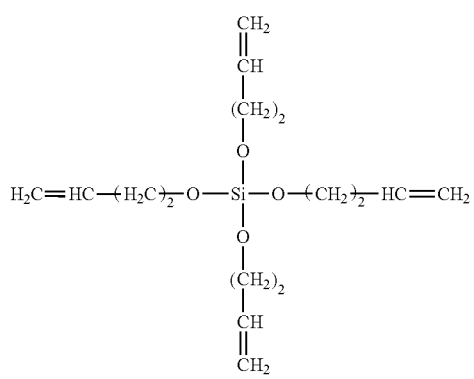

[Formula 7]

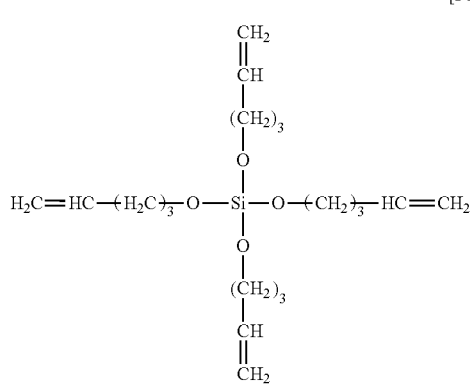

[Formula 8]

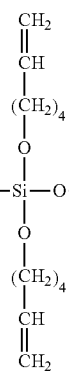
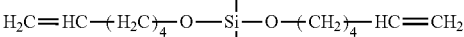

[Formula 9]

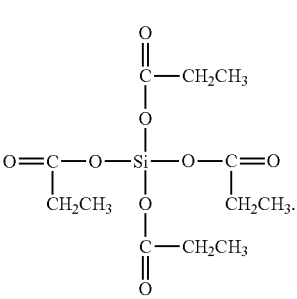

The compound represented by Formula 1 may be present in a range of about 0.01 wt % to about 10 wt % based on a total weight of the electrolyte.

The organic solvent may include one or more of a carbonate-based compound, an ester-based compound, an ether-based compound, a ketone-based compound, an alcohol-based compound, or an aprotic solvent.

The electrolyte may further include a lithium salt.

The organic solvent may include about 20 vol % to about 80 vol % of a cyclic carbonate compound and about 20 vol % to about 70 vol % of a chain carbonate compound.

Embodiments are also directed to a lithium battery including a cathode, an anode, and at least one selected from the electrolyte as described above and a reaction product of the electrolyte as described above.

The lithium battery may operate in a voltage range of about 2.8 V to about 4.3 V.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
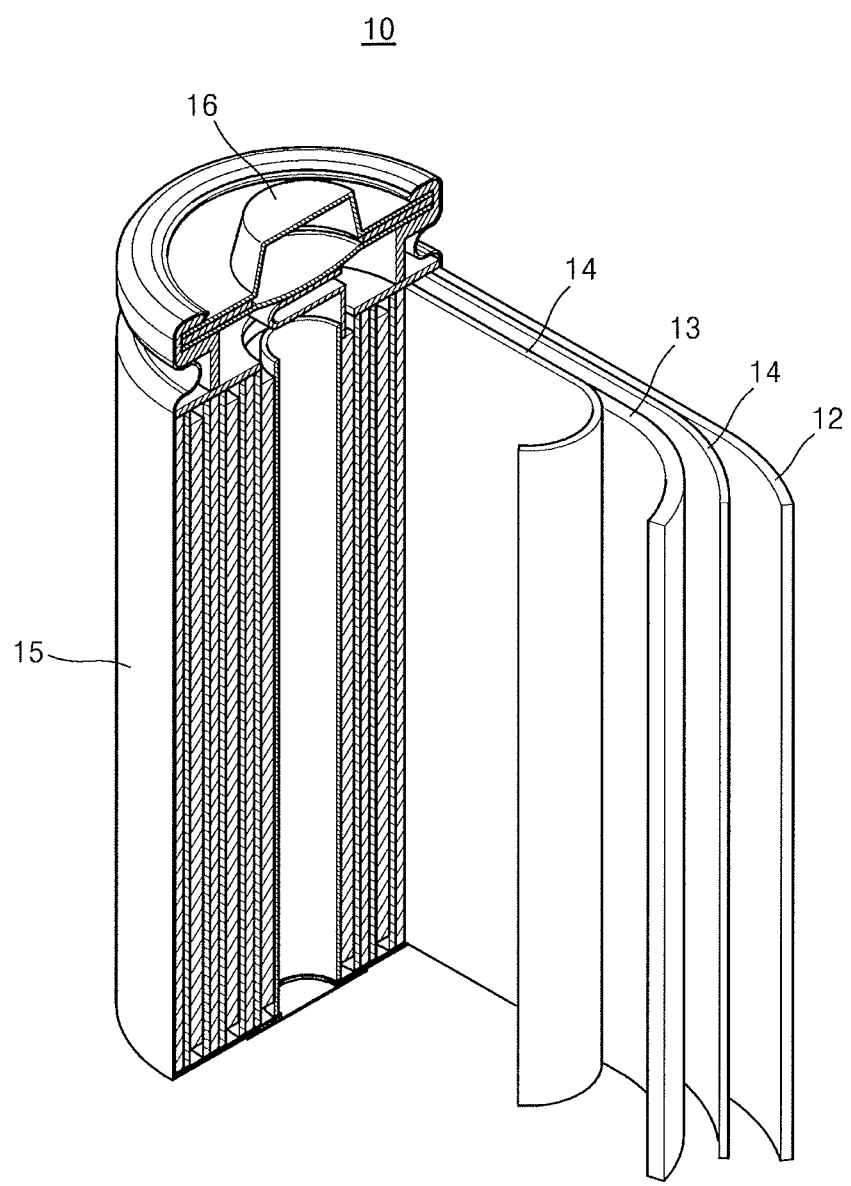
FIG. 1 illustrates a schematic view showing a schematic structure of a lithium battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

Expressions such as "at least one of," when preceding a list of elements, modify the entire list of elements and do not modify the individual elements of the.

According to an embodiment, an electrolyte for a lithium battery includes an organic solvent and a compound represented by Formula 1.

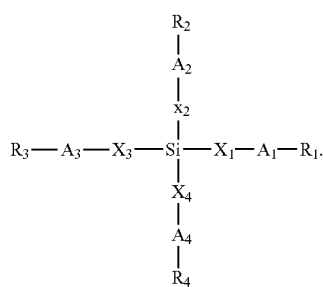

[Formula 1]

In Formula 1, $X_1$ to $X_4$ are each independently oxygen (O) or nitrogen (N), $A_1$ to $A_4$ each independently denote a chemical bond, an unsubstituted or substituted C1-C10 alkylene group, an unsubstituted or substituted C6-C10 arylene group, an unsubstituted or substituted C7-C10 arylalkylene group, an unsubstituted or substituted C2-C10 heteroarylene group, an unsubstituted or substituted C3-C10 heteroarylalkylene group, or an unsubstituted or substituted C4-C10 carbocyclic group, at least one of $R_1$ to $R_4$ is $-C(R_5)=Y_1$, where $Y_1$ is $C(R_6)(R_7)$ or oxygen (O), $R_5$ to $R_7$ are each independently hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom, and the remaining $R_1$ to $R_4$ are each independently hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom.

In some embodiments, $X_1$ to $X_4$ are all oxygen (O).

For example, the chemical bond may denote a single bond.

In Formula 1, for example, $A_1$ to $A_4$ may be each independently an alkylene group having 1 to 4 carbon atoms, or, in particular, a methylene group, an ethylene group, a propylene group, or a butylene group.

At least one of $R_1$ to $R_4$ is $-C(R_5)=Y_1$, where $Y_1$ is $C(R_6)(R_7)$ or oxygen (O). In this regard, at least one of $R_1$ to $R_4$ contains a C=C double bond or a C=O double bond.

$-C(R_5)=Y_1$ may be, for example, $CH=CH_2$, $-C=O$, $C=C(CH_3)$, or $C=C(CH_2CH_3)$.

The compound represented by Formula 1 may include at least one of a C=C double bond or a C=O double bond as described above and may have a Si—O bond or a Si—N bond.

The Si—O bond or Si—N bond may include silicon and oxygen or silicon and nitrogen between which an electronegativity is high. A bond thereof may have characteristics similar to those of an ionic bond. In this regard, the compound of Formula 1 having a Si—O bond or a Si—N bond having ionic bond-like characteristics may be stable in terms of the energy, may have good stability as a material itself, and may have good stability with respect to heat and reduction. When the compound of Formula 1 is used as an electrolyte additive, deformation may be avoided during a high temperature storage, and thus a silicon-containing film may be provided. A film having a low resistance and a high electronegativity may be formed on a surface of an anode. Thus, output characteristics of a lithium battery including the electrolyte may be improved. As described above, the film formed on the surface of an anode may be a solid electrolyte interface (SEI) layer with improved stability such that firmness may be maintained even after a long period of charging/discharging.

When the compound of Formula 1 is used as an electrolyte additive, a firm film may also be formed on a surface of a cathode. The film may serve as a protective layer. In this regard, when the film is formed on the surface of a cathode, direct contact between an organic solvent and the cathode may be effectively blocked, and side reactions in the cathode may be suppressed. Decomposition of a solvent and a salt may be suppressed. As a result, reversibility of lithium ion intercalation/deintercalation may be further improved, and deterioration of a battery according to charging/discharging may not occur. In this regard, stability of the battery may be increased, and life characteristics of the battery may be improved.

When the compound represented by Formula 1 is included in a battery, capacity stabilization may be fast when the battery is continuously charged/discharged, and occurrence of resistance drop (IR drop) may decrease. An increase in resistance of the lithium battery may hardly occur, and the battery may have thermally stable characteristics. High-temperature characteristics and output characteristics of the battery may be improved.

For example, the compound represented by Formula 1 may be a compound represented by Formula 2 or a compound represented by Formula 3.

[Formula 2]

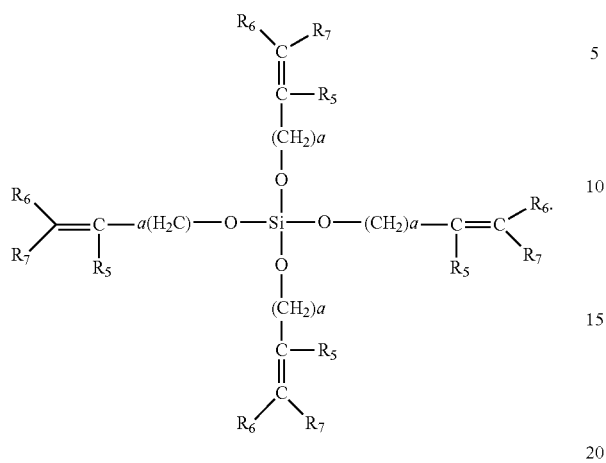

In Formula 2, a is independently from 1 to 4, and $R_5$ to $R_7$ are each independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom,

[Formula 3]

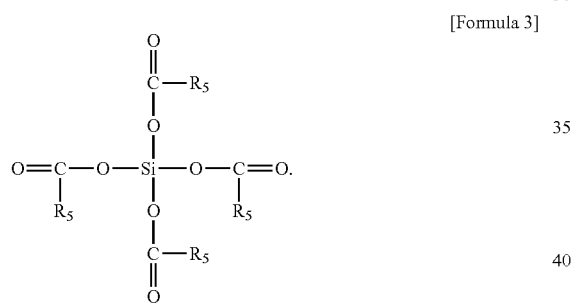

In Formula 3, $R_5$ is independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom.

The compound represented by Formula 1 may be at least one selected from compounds represented by Formulae 4 to 9.

[Formula 4]

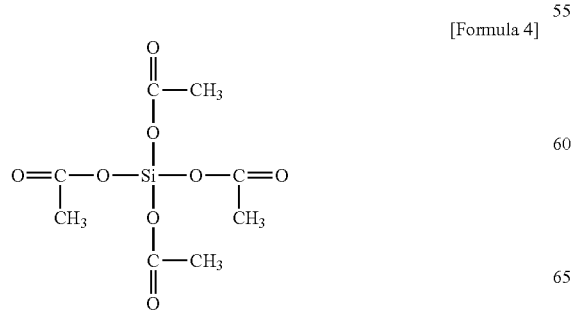

[Formula 5]

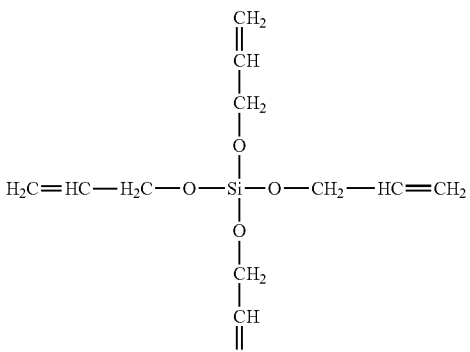

[Formula 6]

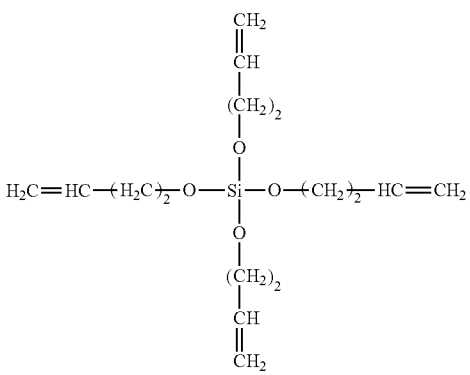

[Formula 7]

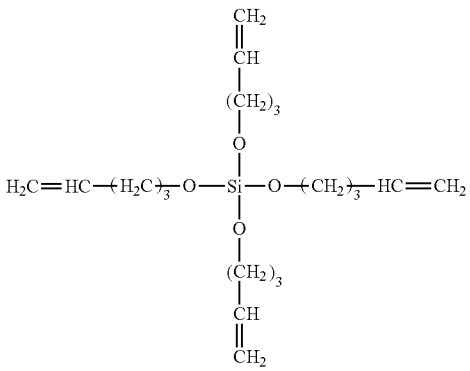

[Formula 8]

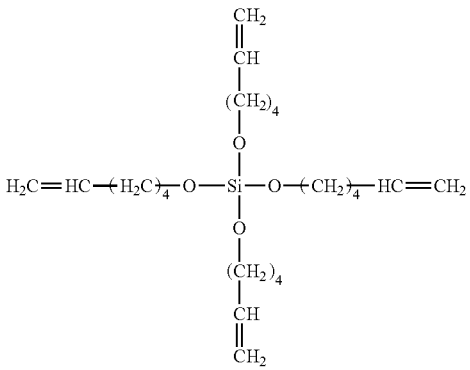

-continued

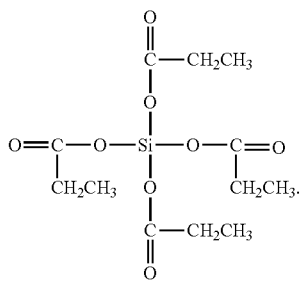

[Formula 9]

The compound represented by Formula 1 may be present in a range of about 0.01 wt % to about 10 wt %, for example, about 0.5 wt % to about 3 wt % of the electrolyte. When the amount of the compound represented by Formula 1 is within this range, the compound represented by Formula 1 contained in the electrolyte may form a silicon-containing film on a surface of an anode of a lithium battery. Life characteristics and output characteristics of the lithium battery at a high temperature may be improved.

A non-aqueous organic solvent, which is included in the electrolyte for a lithium battery, may serve as a medium through which ions involved in an electrochemical reaction of the battery migrate. The non-aqueous organic solvent may be, for example, a carbonate-based compound, an ester-based compound, an ether-based compound, a ketone-based compound, an alcohol-based compound, an aprotic solvent, or a combination thereof.

The carbonate-based compound may be, for example, a chain-type carbonate compound, a cyclic carbonate, or a combination thereof. The carbonate-based compound may be a fluorinated carbonate-based compound (hereinafter referred to as a "fluorocarbonate compound").

The chain carbonate compound may be, for example, diethyl carbonate (DEC), dimethyl carbonate (DMC), dipropyl carbonate, (DPC), (MPC), ethylpropylcarbonate (EPC), methylethyl carbonate (MEC), or a combination thereof.

The ring-type carbonate compound may be, for example, ethylene carbonate (EC), propylene carbonate (PC), butylene carbonate (BC), vinylethylene carbonate (VEC), or a combination thereof.

The fluorocarbonate compound may be, for example, fluoroethylene carbonate (FEC), 4,5-difluoroethylenecarbonate, 4,4-difluoroethylenecarbonate, 4,4,5-trifluoroethylenecarbonate, 4,4,5,5-tetrafluoroethylenecarbonate, 4-fluoro-5-methylethylenecarbonate, 4-fluoro-4-methylethylenecarbonate, 4,5-difluoro-4-methylethylenecarbonate, 4,4,5-trifluoro-5-methylethylenecarbonate, trifluoromethylethylenecarbonate, or a combination thereof.

The carbonate-based compound may be used as a mixture of the chain and cyclic carbonate compounds. For example, the ring-type carbonate compound may be included in the electrolyte in an amount of at least about 20 vol % or more, for example, about 30 vol % or more, for example, about 40 vol % or more based on the total volume of the non-aqueous organic solvent to significantly improve cycle characteristics of the battery. The ring-type carbonate compound may be included in the electrolyte in an amount in a range of about 20 vol % to about 80 vol %, for example, about 40 vol % to about 70 vol %, based on the total volume of the non-aqueous organic solvent.

The chain carbonate compound may be contained in the electrolyte in an amount in a range of about 20 vol % to about 80 vol % based on the total volume of the non-aqueous organic solvent.

In some embodiments, the organic solvent may include about 20 vol % to about 80 vol % of the cyclic carbonate compound and about 20 vol % to about 80 vol % of the chain carbonate compound.

The carbonate-based compound may be used as a mixture including the fluorocarbonate compound in addition to the non-fluorinated chain- and/or cyclic carbonate compounds. The fluorocarbonate compound may increase a solubility of a lithium salt, and thus, may improve ion conductivity and facilitate film formation on a surface of an anode. In some embodiments, the fluorocarbonate compound may be fluoroethylene carbonate (FEC).

The fluorocarbonate compound may be included in the electrolyte in an amount in a range of about 1 vol % to about 30 vol % based on the total volume of the electrolyte. When an amount of the fluorocarbonate compound is within this range, the additional effect of the fluorocarbonate compound may be obtained while maintaining an appropriate viscosity of the electrolyte. In some embodiments, the non-aqueous organic solvent may further include vinylethylene carbonate (VEC) in addition to fluoroethylene carbonate (FEC). Here, vinylethylene carbonate (VEC) may be included in the electrolyte in an amount in a range of about 0.1 vol % to about 10 vol % based on the total volume of the electrolyte.

The ester-based compound may be, for example, methylacetate, acetate, n-propylacetate, dimethylacetate, methylpropionate, ethylpropionate, γ-butyrolactone, decanolide, valerolactone, mevalonolactone, caprolactone, or methylformate.

The ether-based compound may be, for example, dibutyl ether, tetraglyme, diglyme, 1,2-dimethoxyethane, 1,2-diethoxyethane, ethoxymethoxyethane, 2-methyltetrahydrofuran, or tetrahydrofuran.

The ketone-based compound may be cyclohexanone.

The alcohol-based compound may be ethyl alcohol or isopropyl alcohol.

The aprotic solvent may be dimethylsulfoxide, 1,2-dioxolane, sulfolane, methyl sulfolane, 1,3-dimethyl-2-imidazolidinone, N-methyl-2-pyrrolidinone, formamide, dimethylformamide, acetonitrile, nitromethane, phosphate, triethyl phosphate, trioctyl phosphate, or triester phosphate.

The non-aqueous organic solvent may be one type or a mixture of at least two types. When at least two types are mixed, a mixture ratio may be appropriately adjusted according to desired battery performance.

The electrolyte for a lithium battery may further include a lithium salt.

The lithium salt may serve as a source of lithium ions in a battery and thus may enable basic operation of a lithium battery. The lithium salt may be a suitable lithium salt for use in a lithium battery. The lithium salt may be a material that readily dissolves in the non-aqueous electrolyte. The lithium salt may be, for example, at least one material selected from LiCl, LiBr, LiI, LiClO$_4$, LiB$_{10}$Cl$_{10}$, LiPF$_6$, CF$_3$SO$_3$Li, CH$_3$SO$_3$Li, C$_4$F$_3$SO$_3$Li, (CF$_3$SO$_2$)$_2$NLi, LiN(C$_x$F$_{2x+1}$SO$_2$)(C$_y$F$_{2+y}$SO$_2$) (where, x and y are natural numbers), CF$_3$CO$_2$Li, LiAsF$_6$, LiSbF$_6$, LiAlCl$_4$, LiAlF$_4$, lithium chloroborate, lithium lower aliphatic carbonate, lithium 4-phenyl borate, and lithium imide.

In order to secure practical performance of a lithium battery, a concentration of the lithium salt may be in a range of about 0.1 M to about 5.0 M, for example, about 0.1 M to about 2.0 M. When the concentration of the lithium salt is within this range, an electrolyte may have appropriate conductivity and viscosity such that lithium ions may effectively migrate through the electrolyte. Thus, the electrolyte may exhibit excellent performance.

The electrolyte for a lithium battery may further include an additive to additionally improve cycle characteristics by assisting formation of a stable SEI or film on a surface of an electrode.

The additive may be, for example, tris(trimethylslyl) phosphate (TMSPa), lithium difluorooxalatoborate (LiFOB), vinylene carbonate (VC), propanesultone (PS), succinonitrile (SN), $LiBF_4$, a silane compound such as one having a functional group capable of forming a siloxane bond with acryl, amino, epoxy, methoxy, ethoxy, or vinyl, or a silazane such as hexamethyldisilazane. The additive may be added alone or as a combination of at least two additives.

The additive may be included in the electrolyte in an amount that does not significantly reduce a capacity retention rate improving effect of the lithium battery according to inclusion of the electrolyte. For example, the additive may be included in a range of about 0.01 wt % to about 10 wt % based on the total weight of the non-aqueous organic solvent. For example, the additive may be included in the electrolyte in an amount in a range of about 0.05 wt % to about 10 wt %, for example, about 0.1 wt % to about 5 wt %, or about 0.5 wt % to about 4 wt % based on the total weight of the non-aqueous organic solvent.

The electrolyte according to an embodiment may be included in a lithium battery that operates at a high voltage in a range of about 2.8 V to about 4.3 V. Thus, the electrolyte may improve cell performance and stability of the lithium battery. For example, the electrolyte may be included in a high voltage battery that operates at a voltage range of about 2.8 V to about 4.3 V.

The lithium battery according to another embodiment may include a cathode, an anode, and the electrolyte for a lithium battery as described herein disposed between the cathode and the anode. According to an implementation, the lithium battery may include a reaction product of the electrolyte. The lithium battery may be prepared by using a suitable preparation method.

The reaction product of the electrolyte may be, for example, a product of a polymerization reaction between double bonds of the compound represented by Formula 1 included in the electrolyte. The polymerization reaction may include a cross-linking reaction.

FIG. 1 illustrates a schematic view of a representative structure of a lithium battery 10 according to an embodiment.

Referring to FIG. 1, the lithium battery 10 may include a cathode 13, an anode 12, and a separator 14 disposed between the cathode 13 and the anode 12. The cathode 13, the anode 12, and the separator 14 may be wound or folded and accommodated in a battery case 15. Then, an electrolyte may be injected into the battery case 15, and the battery case 15 may be sealed with a cap assembly 16, thereby completing manufacture of the lithium battery 10. The battery case 15 may have a cylindrical shape, a box shape, or a thin-film shape. The lithium battery may be a lithium ion battery.

The cathode 13 may include a cathode current collector and a cathode active material layer formed on the cathode current collector.

A thickness of the cathode current collector may be in a range of about 3 μm to about 500 μm. A suitable material having conductivity while not inducing chemical change in the battery may be used for the cathode current collector. For example, the material for the cathode current collector may be copper, stainless steel, aluminum, nickel, titanium, heat-treated carbon, copper or stainless steel that is surface treated with carbon, nickel, titanium, or silver, or an aluminum-cadmium alloy. The cathode current collector may have fine bumps on a surface thereof to increase an adhesive strength with respect to the cathode active material and may be used in various forms, such as a film, a sheet, a foil, a net, a porous structure, a foam structure, or a non-woven structure.

The cathode active material layer may include a cathode active material, a binder, and, optionally, a conducting agent.

The cathode active material may be a suitable material such as a lithium-containing metal oxide.

For example, the cathode active material may be a compound represented by a formula selected from $Li_aA_{1-b}B_bD_2$ (where, $0.90 \leq a \leq 1.8$ and $0 \leq b \leq 0.5$); $Li_aE_{1-b}B_bO_{2-c}D_c$ (where, $0.90 \leq a \leq 1.8$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 < \alpha^2$); $Li_aNi_{1-b-c}Mn_bB_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulae above, A, B, D, E, F, G, Q, I, and J represent variables, as further defined. In particular, A is Ni, Co, Mn, or a combination thereof; B is Al, Ni, Co, Mn, Cr, Fe, Mg, Sr, V, a rare earth element or a combination thereof; D is O, F (fluorine), S, P, or a combination thereof; E is Co, Mn, or a combination thereof; F is F (fluorine), S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the compound may be $LiCoO_2$, $LiMn_xO_{2x}$ (where, x=1 or 2), $LiNi_{1-x}Mn_xO_{2x}(0<x<1)$, $LiNi_{1-x-y}Co_xMn_yO_2$ (where, $0<x<0.5$ and $0<y<0.5$), or $FePO_4$.

The compound may have a coating layer on a surface thereof, or the compound may be mixed with a compound having a coating layer. The coating layer may include a coating element compound of an oxide or a hydroxide of a coating element, an oxyhydroxide of a coating element, an oxycarbonate of a coating element, or a hydroxycarbonate of a coating element. The compound forming the coating layer may be amorphous or a crystalline. A coating element included in the coating layer may be Mg, Al, Co, K, Na, Ca, Si, Ti, V, Sn, Ge, Ga, B, As, Zr, or a mixture thereof. A process of forming the coating layer may be carried out by adding the elements into the compound by using a method (e.g., spray-coating or dipping) that does not negatively affect properties of the positive electrode active material.

The binder may attach particles of the cathode active material to one another and may attach the cathode active material to the cathode current collector. Examples of the binder include polyvinyl alcohol, carboxymethyl cellulose, hydroxypropyl cellulose, diacetyl cellulose, polyvinylchloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The conducting agent may be a suitable electron conducting material that provides conductivity to the electrode and that does not induce chemical change in the battery. Examples of the conducting agent may include natural graphite, artificial graphite, carbon black, acetylene black, Ketjen black, carbon fiber, metal powder or metal fiber of copper, nickel, aluminum, silver, and conductive materials, such as polyphenylene derivatives, which may be used alone or in a combination of at least two thereof.

The anode 12 may include an anode current collector and an anode active material layer formed on the anode current collector.

A thickness of the anode current collector may be within a range of about 3 µm to about 500 µm. A material for the anode current collector may be a material that has conductivity while not inducing chemical change in the battery. For example, the material for the anode current collector may be copper, stainless steel, aluminum, nickel, titanium, heat-treated carbon, copper, or stainless steel that is surface treated with carbon, nickel, titanium, or silver, or an aluminum-cadmium alloy. The anode current collector may have fine bumps on a surface thereof to increase an adhesive strength with respect to the anode active material and may be used in various forms, such as a film, a sheet, a foil, a net, a porous structure, a foam structure, or a non-woven structure.

The anode active material layer may include an anode active material, a binder, and, optionally, a conducting agent.

The anode active material may include a silicon-based anode active material.

The anode active material may be a suitable material such as a lithium metal, a metal alloyable with lithium, a transition metal oxide, a material capable of doping or de-doping lithium, or a material capable of reversible intercalation/deintercalation of lithium ions. The anode active material may be a mixture or a combination of at least two selected from above.

The alloy of lithium metal may be an alloy of lithium and one metal selected from the group consisting of Na, K, Rb, Cs, Fr, Be, Mg, Ca, Sr, Si, Sb, Pb, In, Zn, Ba, Ra, Ge, Al, and Sn.

Examples of the transition metal oxide include a tungsten oxide, a molybdenum oxide, a titanium oxide, a lithium titanium oxide, a vanadium oxide, and a lithium vanadium oxide.

The material capable of doing or de-doping lithium may be, for example, Sn, $SnO_2$, or a Sn—Y alloy (where, Y is an alkali metal, an alkali earth metal, a Group XI element, a Group XII element, a Group XIII element, a Group XIV element, a Group XV element, a Group XVI element, a transition metal, a rare earth element, or a combination thereof except for Sn). The material capable of doing or de-doping lithium may be, for example, Si, $SiO_2$, or a Si—Y alloy (where, Y is an alkali metal, an alkali earth metal, a Group XI element, a Group XII element, a Group XIII element, a Group XIV element, a Group XV element, a Group XVI element, a transition metal, a rare earth element, or a combination thereof except for Si). In either case, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The material capable of reversible intercalation/deintercalation of lithium ions may include a suitable carbon-based material for use as a carbon-based anode active material in a lithium battery. For example, the carbon-based material may be crystalline carbon, amorphous carbon, or a mixture thereof. Examples of the crystalline carbon include natural graphite, artificial graphite, expanded graphite, graphene, fullerene soot, carbon nanotubes, and carbon fibers. Examples of the amorphous carbon include soft carbon (carbon heat treated at a relatively low temperature) or hard carbon, mesophase pitch carbide, and heat-treated cokes. The carbon-based anode active material may be in a form of a sphere shape, a plate shape, a fibrous shape, a tube shape, or a powder form.

The binder may attach particles of the anode active material to one another and attaches the anode active material to a current collector. Examples of the binder may include polyvinyl alcohol, carboxymethyl cellulose, hydroxypropyl cellulose, polyvinylchloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The conducting agent may a suitable electron conducting material that provides conductivity to the electrode and that does not induce chemical change in the battery. Examples of the conducting agent may include natural graphite, artificial graphite, carbon black, acetylene black, Ketjen black, carbon fiber, metal powder or metal fiber of copper, nickel, aluminum, silver, conductive materials, such as polyphenylene derivatives, or a mixture thereof.

The cathode 13 and the anode 12 may each be prepared by preparing an active material composition by mixing an active material, a conducting agent, and a binder in a solvent and coating the composition on a current collector. The solvent may be N-methylpyrrolidone (NMP), acetone, or water, as examples.

The cathode 13 and the anode 12 may be separated by the separator 14. The separator 14 may be formed of a suitable material for use as a separator in a lithium battery. For example, a material that has low resistance to ion migration of the electrolyte and has an excellent electrolyte solution holding ability may be used. The separator 14 may be a single layer or multiple layers. For example, the separator 14 may be formed of glass fiber, polyester, Teflon, polyethylene, polypropylene, polytetrafluoroethylene (PTFE), or a combination thereof, which may have a non-woven form or a woven form. A pore diameter of the separator 14 may be in a range of about 0.01 µm to about 10 m, and a thickness of the separator 14 is generally in a range of about 3 µm to about 100 µm.

The electrolyte may be an electrolyte for a lithium battery that includes the compound represented by Formula 1 as an additive, as described above. The electrolyte may be injected to a space formed by the separation of the cathode 13 and the anode 12 by the separator 14.

A lithium battery according to an embodiment may be used according to its appropriate use, such as a main power source of a video camera, a laptop computer, a mobile phone, and personal handyphone service (PHS), a back-up power of a memory, an alternative power source in case of instantaneous black-out of a PC, application to an EV or a hybrid vehicle, or a solar power generation energy storage system that has a solar battery.

Hereinafter are definitions of substituents used in the chemical formulae.

The term "alkyl" used in a chemical formula refers to a fully saturated branched or unbranched (or straight chain or linear) hydrocarbon group.

Examples of "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethyl pentyl, and n-heptyl.

At least one hydrogen atom in the "alkyl" may be substituted with a halogen atom, a C1-C20 alkyl group (e.g.: $CCF_3$, $CHCF_2$, $CH_2F$, or $CCl_3$) substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxylic acid or a salt thereof, a sulfonyl group, a sulfamoyl group, a sulfonic acid or a salt thereof, a phosphoric acid or a salt thereof, or a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" includes fluorine, bromine, chlorine, and iodine.

The term "a C1-C20 alkyl group substituted with a halogen atom" refers to a C1-C20 alkyl group that is substituted with at least one halogen group. Examples of the "C1-C20 alkyl group substituted with a halogen atom" include monohaloalkyl or polyhaloalkyl including dihaloalkyl or perhaloalkyl.

The monohalokalkyl may include one iodine, bromine, chlorine, or fluorine in the alkyl group. The terms "dihaloalkyl" or "polyhaloalkyl" denote an alkyl group having at least two halogen atoms that are identical to or different from each other.

The term "alkoxy" used in a chemical formula refers to alkyl-O—, wherein "alkyl" is an alkyl group as described above. Examples of alkoxy include methoxy, ethoxy, propoxy, butoxy, tert-butoxy, pentyloxy, hexyloxy, cyclopropoxy, and cyclohexyloxy. In the alkoxy group, at least one hydrogen atom may be substituted with the same substituent groups as described above in connection with the alkyl group.

The term "alkoxyalkyl" used in a chemical formula refers to the case where an alkyl group is substituted with the alkoxy group described above. At least one hydrogen atom of the alkoxyalkyl may be substituted with the same substituent groups as described above in connection with the alkyl group. The term "alkoxyalkyl" includes an alkoxyalkyl moiety.

The term "alkenyl" used in a chemical formula refers to a branched or non-branched hydrocarbon having at least one carbon-carbon double bond. Examples of the alkenyl group include vinyl, allyl, butenyl, isopropenyl, and isobutenyl. At least one hydrogen atom of the alkenyl group may be substituted with the same substituent groups as described above in connection with the alkyl group.

The term "alkynyl" used in a chemical formula refers to a branched or non-branched hydrocarbon having at least one carbon-carbon triple bond. Examples of the alkynyl group include ethynyl, butynyl, isobutynyl, and isopropynyl.

At least one hydrogen atom of the alkynyl group may be substituted with the same substituent groups as described above in connection with the alkyl group.

The term "aryl" used in a chemical formula refers to an aromatic hydrocarbon that may be used alone or in a combination and that includes at least one ring.

The term "aryl" includes a group in which aromatic rings are fused in one or more cycloalkyl rings. Examples of aryl may be phenyl, naphthyl, and tetrahydronaphthyl. Also, at least one hydrogen atom in the aryl group may be substituted with the same substituent groups as described above in connection with the alkyl group.

The term "arylalkyl" used in a chemical formula refers to an alkyl group substituted with an aryl group. Examples of the arylalkyl include benzyl and phenyl-$CH_2CH_2$—.

The term "aryloxy" used in a chemical formula refers to —O-aryl. Examples of the aryloxy group include phenoxy. At least one hydrogen atom in the aryl group may be substituted with the same substituent groups as described above in connection with the alkyl group.

The term "heteroaryl" used in a chemical formula refers to a monocyclic or bicyclic organic compound including at least one heteroatom selected from N, O, P, and S, and the remaining ring atoms are C. For example, the heteroaryl group may include 1 to 5 heteroatoms and may include 5 to 10 ring members, wherein S or N may be oxidized to various oxidation states. At least one hydrogen atom in the heteroaryl group may be substituted with the same substituent groups as described above in connection with the alkyl group.

The term "heteroarylalkyl" refers to an alkyl group substituted with heteroaryl.

The term "heteroaryloxy" refers to a —O-heteroaryl moiety. At least one hydrogen atom in the heteroaryloxy group may be substituted with the same substituent groups as described above in connection with the alkyl group.

The term "heteroaryloxyalkyl" denotes an alkyl group substituted with heteroaryloxy. At least one hydrogen atom in the heteroaryloxyalkyl group may be substituted with the same substituent groups as described above in connection with the alkyl group.

The term "carbocyclic group" used in a chemical formula refers to a saturated or partially unsaturated non-aromatic monocyclic, bicyclic, or tricyclic hydrocarbon group.

Examples of the monocyclic hydrocarbon group include cyclopentyl, cyclopentenyl, cyclohexyl, and cyclohexenyl. Examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl. Examples of the tricyclic hydrocarbon include adamantane.

At least one hydrogen atom in the carbon ring of the carbocyclic group may be substituted with the same substituent groups as described above in connection with the alkyl group.

The term "a hetero-ring" group, or a "heterocycloalkyl" group used in a chemical formula refers to a ring group composed of 5 to 10 atoms containing a heteroatom, such as nitrogen, sulfur, phosphor, or oxygen. In particular, an example of the hetero-ring group is pyridyl. At least one hydrogen atom in the "hetero-ring group" or the "heterocycloalkyl group" may be substituted with the same substituent groups as described above in connection with the alkyl group.

The term "heterocyclicoxy" or "heterocycloxy" denotes a —O-hetero-ring or a O-heterocycloalkyl group. At least one hydrogen atom in the "heterocyclicoxy" group or the "heterocycloxy" group may be substituted with the same substituent groups as described above in connection with the alkyl group.

The term "sulfonyl" denotes R"—SO$_2$—, wherein, R" is a hydrogen atom, alkyl, aryl, heteroaryl, aryl-alkyl, heteroaryl-alkyl, alkoxy, aryloxy, cycloalkyl group, or a hetero-ring group.

The term "sulfamoyl" denotes H$_2$NS(O$_2$)—, alkyl-NHS(O$_2$)—, (alkyl)$_2$NS(O$_2$)-aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—.

At least one hydrogen atom in the "sulfamoyl group" may be substituted with the same substituent groups as described above in connection with the alkyl group.

The term "amino group" includes a nitrogen atom that is covalently bonded to at least one carbon atom or heteroatom. The amino group includes —NH$_2$ and substituted moieties. Examples of the amino group include an alkylamino group, in which a nitrogen atom is attached to at least one additional alkyl group, and an aryl amino group or a diarylamino group, in which a nitrogen atom is attached to at least one or two independently selected aryl groups.

The alkylene, arylene, and heteroarylene each respectively denote a divalent group derived from an alkyl group, an aryl group, and a heteroaryl group.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of Electrolyte

LiPF$_6$ was added to a mixture solvent including ethylene carbonate (EC), propylene carbonate (PC), and diethyl carbonate (DEC) at a volume ratio of 20:40:40 to obtain a mixture solution such that a concentration of LiPF$_6$ in the mixture solvent was 1.15 M. 1 wt % of a compound represented by Formula 5 was added to the mixture solution to prepare an electrolyte.

[Formula 5]

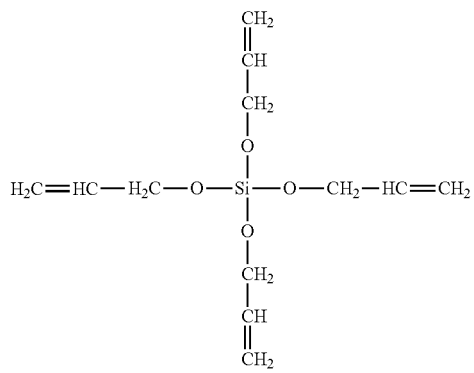

Example 2: Preparation of Electrolyte

An electrolyte was prepared in the same manner as in Example 1, except that a compound represented by Formula 4 was used instead of the compound represented by Formula 5.

[Formula 4]

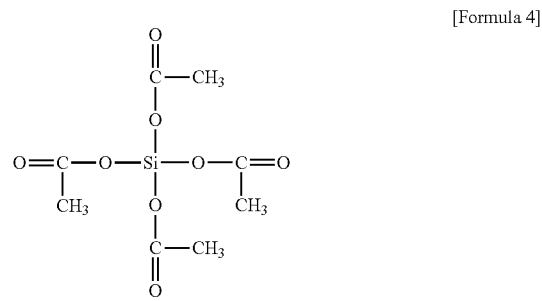 [SMILES: CC(=O)O[Si](OC(C)=O)(OC(C)=O)OC(C)=O]

Example 3: Preparation of Electrolyte

An electrolyte was prepared in the same manner as in Example 1, except that an amount of the compound represented by Formula 5 was changed to 0.1 wt %.

Example 4: Preparation of Electrolyte

An electrolyte was prepared in the same manner as in Example 1, except that an amount of the compound represented by Formula 5 was changed to 10 wt %.

Example 5: Preparation of Electrolyte

An electrolyte was prepared in the same manner as in Example 2, except that an amount of the compound represented by Formula 4 was changed to 0.1 wt %.

Example 6: Preparation of Electrolyte

An electrolyte was prepared in the same manner as in Example 2, except that an amount of the compound represented by Formula 4 was changed to 10 wt %.

Examples 7-10: Preparation of Electrolyte

Electrolytes were prepared in the same manner as in Example 1, except that a compound represented by Formula 6, a compound represented by Formula 7, a compound represented by Formula 8, and a compound represented by Formula 9 were respectively used instead of the compound represented by Formula 5.

Comparative Example 1: Preparation of Electrolyte

An electrolyte was prepared in the same manner as in Example 1, except that tetrapropyl orthosilicate was used instead of the compound represented by Formula 5.

Manufacture Example 1: Manufacture of Coin Cell

N-methylpyrrolidone was added to control a viscosity of a mixture prepared by mixing mesocarbon as an anode active material, styrene-butadiene rubber, and carboxymethylcellulose, at a weight ratio of 97.5:5.1:5.1 such that an amount of solid in the mixture was 60 wt % to prepare an anode active material slurry. A copper foil current collector having a thickness of 10 μm was coated with the slurry, dried and pressed to prepare an electrode.

The electrode thus prepared was used as a working electrode, and a lithium electrode was used as a reference electrode and a counter electrode. A coin cell prepared by using the electrodes was accommodated in a battery case, a separator (Celgard) was disposed between the electrodes, and the electrolyte prepared in Example 1 was injected thereto, thereby completing manufacture of a coin cell.

Manufacture Examples 2-10: Manufacture of Coin Cell

Coin cells were manufactured in the same manner as in Manufacture Example 1, except that the electrolytes prepared in Examples 2 to 10 were respectively used instead of the electrolyte prepared in Example 1.

Comparative Manufacture Example 1: Manufacture of Coin Cell

A coin cell was prepared in the same manner as in Manufacture Example 1, except that the electrolyte prepared in Comparative Example 1 was used instead of the electrolyte prepared in Example 1.

Evaluation Example 1: Cyclic Voltammetry Analysis

Cyclic voltammetry was performed on the coin cells manufactured in Manufacture Examples 1 and 2 and Comparative Manufacture Example 1 by using M273A potentiostat/galvanostat (EG&G) at a scanning rate of about 2 mV/s.

The cyclic voltammetry was performed by using an impedance measuring instrument (BioLogic), and the analysis conditions included measurement of 5 cycles from 0 V to 3V to 0V at a scanning rate of 2 mV/s. The measurement was performed by observing a voltage change while supplying a constant current.

Figure 2:
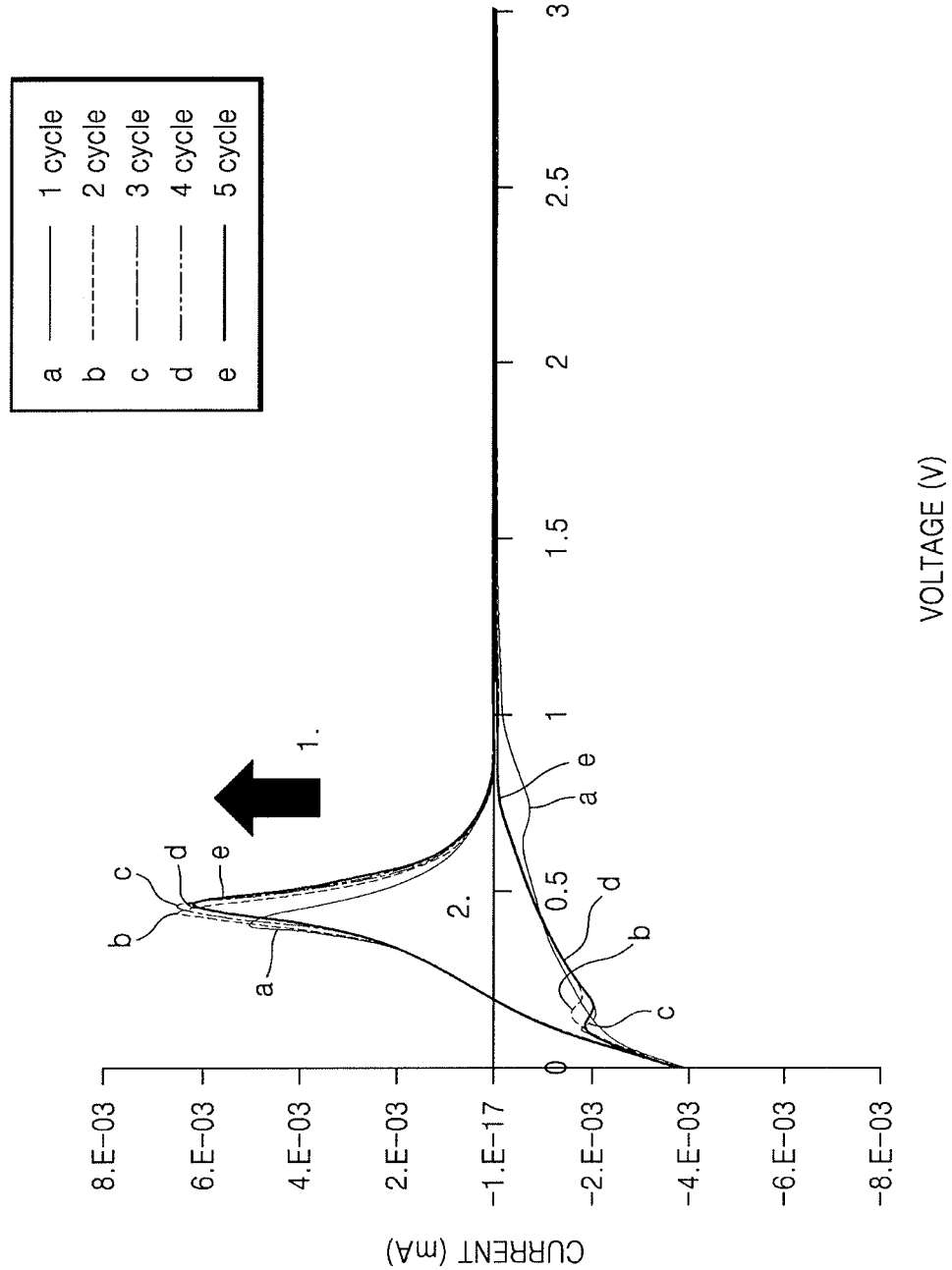
FIGS. 2 to 4 illustrate the results of cyclic voltammetry analysis performed on coin cells prepared in Manufacture Examples 1 and 2 and Comparative Manufacture Example 1, respectively.
Figure 3:
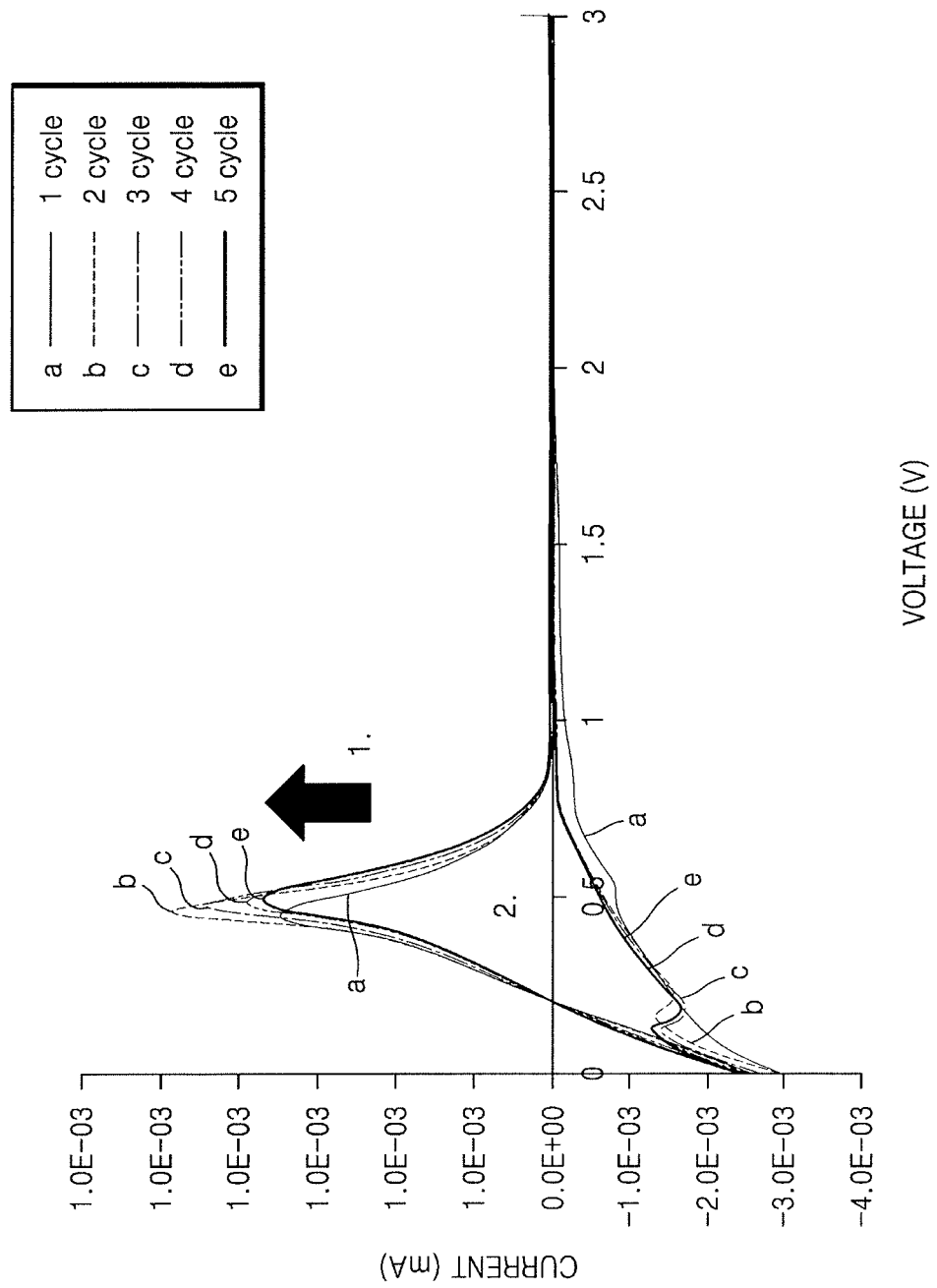
Figure 4:
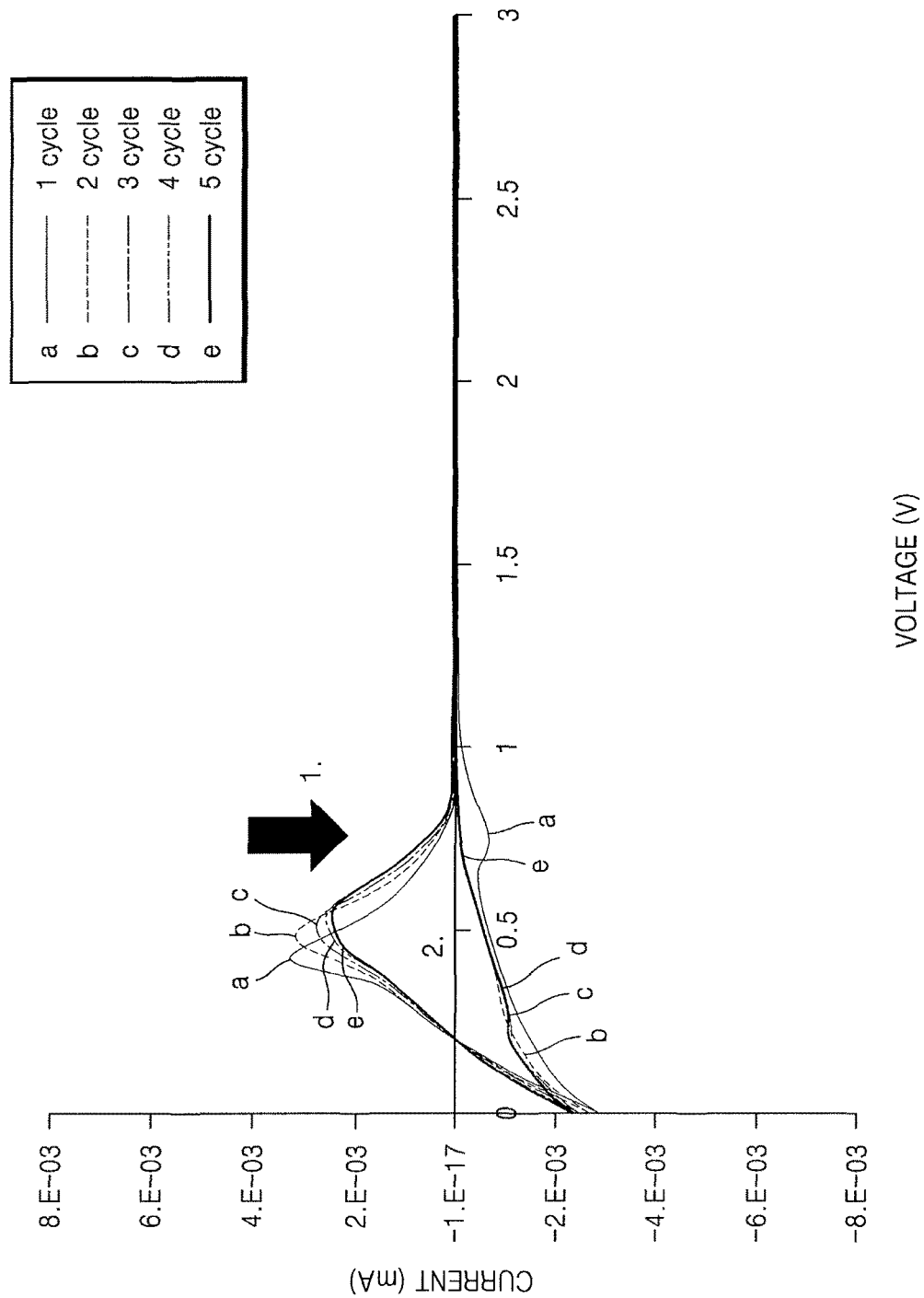

The results of the cyclic voltammetry analysis performed on the coin cells manufactured in Manufacture Examples 1 and 2 and the coin cell manufactured in Comparative Manufacture Example 1 are shown in FIG. 2 to FIG. 4, respectively.

As indicated with "1" in FIG. 2 to FIG. 4, discharge capacities of the coin cells manufactured in Manufacture Examples 1 and 2 and the coin cell manufactured in Comparative Manufacture Example 1 after charging and discharging continuously decreased, and thus it was observed that lifespans thereof reduced. Also, as indicated with "2" in FIG. 2 to FIG. 4, peak areas reduced since the coin cells reacted within the same time period, and thus it may be determined that output resistances of the coin cells tended to increase.

In consideration of the coin cells manufactured in Manufacture Examples 1 and 2 having sharper cycles compared to that of the coin cell manufactured in Comparative Manufacture Example 1, it may be confirmed that resistances of the coin cells of Manufacture Examples 1 and 2 were smaller than the resistance of the coin cell of Comparative Manufacture Example 1. In this regard, it may be indirectly confirmed that the coin cells of Manufacture Examples 1 and 2 had improved output characteristics compared to that of the coin cell of Comparative Manufacture Example 1.

Evaluation Example 2: Evaluation of Charging/Discharging Characteristics at Room Temperature (25° C.)

The coin cells manufactured in Manufacture Examples 1 and 2 and the coin cell manufactured in Comparative Manufacture Example 1 were each duplicated, and the cells were charged with a constant current of 0.1 C rate at a temperature of 25° C. until the voltage reached about 4.35 V (vs. Li), and then cut-off at a current of 0.05 C rate while the voltage was maintained at about 4.35 V in a constant voltage mode. Subsequently, during the discharge, the cells were discharged with a constant current of 0.1 C rate until the voltage reached about 2.8 V (vs. Li) (formation process, $1^{st}$ cycle).

Coin cells prepared after the $1^{st}$ cycle of the formation process were charged at a constant current of 0.2 C rate at a temperature of 25° C. until the voltage reached about 4.35 V (vs. Li), and then cut-off at a current of 0.05 C rate while the voltage was maintained at about 4.35 V in a constant voltage mode. Subsequently, during the discharge, the cells were discharged with a constant current of 0.2 C rate until the voltage reached about 2.8 V (vs. Li) (formation process, $2^{nd}$ cycle).

The lithium batteries prepared after the $2^{nd}$ cycle of the formation process were charged at a constant current of 1.0 C rate at a temperature of 25° C. until the voltage reached about 4.35 V (vs. Li), and then cut-off at a current of 0.05 C rate while the voltage was maintained at about 4.35 V in a constant voltage mode. Subsequently, constant-current discharge was performed at about 0.1 C until the voltage reached about 2.75 V (vs. Li) during the discharge as one cycle. This cycle was performed 200 times.

In the charging/discharging process, a 10 minute resting period preceded every cycle of the charging/discharging.

Capacity retention rates at $200^{th}$ cycle were evaluated by using the charging/discharging test results. The capacity retention rate is defined by Equation 1 below;

Capacity retention rate[%]=[a discharge capacity at $200^{th}$ cycle/a discharge capacity at $1^{st}$ cycle]×100     <Equation 1>

Figure 5:
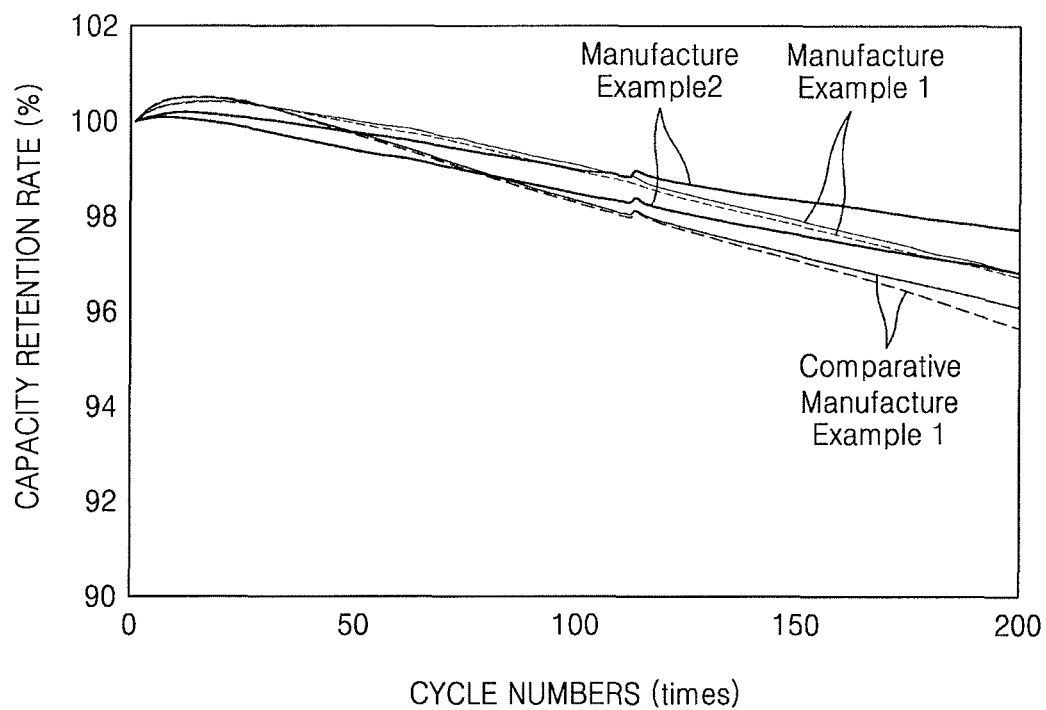
FIG. 5 illustrates capacity retention rates of the coin cells prepared in Manufacture Examples 1 and 2 and Comparative Manufacture Example 1 at 25° C.

The results of the capacity retention rate evaluation are shown in FIG. 5.

Referring to FIG. 5, it may be determined that lifespan characteristics of the coin cells manufactured in Manufacture Examples 1 and 2 at room temperature improved compared to that of the coin cell manufactured in Comparative Manufacture Example 1.

Evaluation Example 3: Evaluation of Charging/Discharging Characteristics at High Temperature (60° C.)

The coin cells manufactured in Manufacture Examples 1 and 2 and the coin cell manufactured in Comparative Manufacture Example 1 were each duplicated, and the cells were charged with a constant current of 0.1 C rate at a temperature of 60° C. until the voltage reached about 4.35 V (vs. Li), and then cut-off at a current of 0.05 C rate while the voltage was maintained at about 4.35 V in a constant voltage mode. Subsequently, during the discharge, the cells were discharged with a constant current of 0.1 C rate until the voltage reached about 2.8 V (vs. Li) ($1^{st}$ cycle of a heat-treating process).

Coin cells prepared after the $1^{st}$ cycle of the formation process were charged at a constant current of 0.2 C rate at a temperature of 60° C. until the voltage reached about 4.35 V (vs. Li), and then cut-off at a current of 0.05 C rate while the voltage was maintained at about 4.35 V in a constant voltage mode. Subsequently, during the discharge, the cells were discharged with a constant current of 0.2 C rate until the voltage reached about 2.8 V (vs. Li) (formation process, $2^{nd}$ cycle).

The lithium batteries prepared after the $2^{nd}$ cycle of the formation process were charged at a constant current of 1.0 C rate at a temperature of 60° C. until the voltage reached about 4.35 V (vs. Li), and then cut-off at a current of 0.05 C rate while the voltage was maintained at about 4.35 V in a constant voltage mode. Subsequently, constant-current discharge was performed at about 0.1 C until the voltage reached about 2.75 V (vs. Li) during the discharge as one cycle. This cycle was performed 60 times.

In the charging/discharging process, a 10 minute resting period preceded every cycle of the charging/discharging.

Capacity retention rates at $60^{th}$ cycle were evaluated by using the charging/discharging test results. The capacity retention rate is defined by Equation 2 below:

Capacity retention rate[%]=[a discharge capacity at $60^{th}$ cycle/a discharge capacity at $1^{st}$ cycle]×100  <Equation 2>

Figure 6:
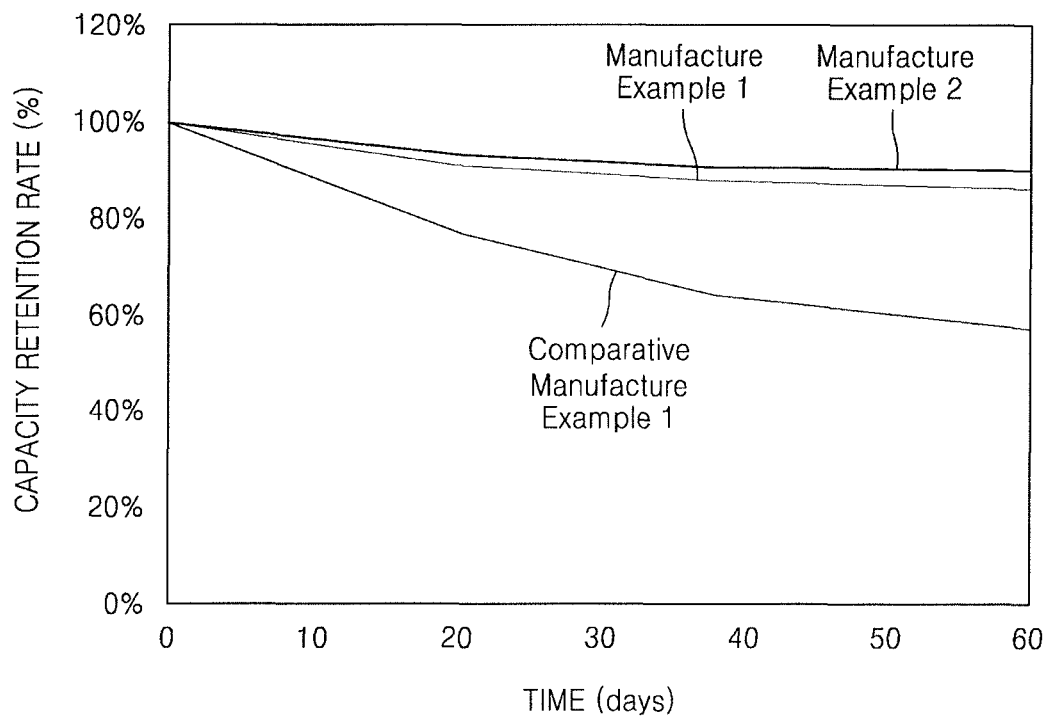
FIG. 6 illustrates capacity retention rates of the coin cells prepared in Manufacture Examples 1 and 2 and Comparative Manufacture Example 1 at 60° C.

The results of the capacity retention rate evaluation are shown in FIG. 6.

Referring to FIG. 6, it may be determined that lifespan characteristics of the coin cells manufactured in Manufacture Examples 1 and 2 at a high temperature improved compared to that of the coin cell manufactured in Comparative Manufacture Example 1.

Evaluation Example 4: Direct Current Resistance (DCIR) at Room Temperature (25° C.)

Direct current resistances of the coin cells manufactured in Manufacture Examples 1 and 2 and Comparative Manufacture Example 1 at room temperature were evaluated.

Figure 7:
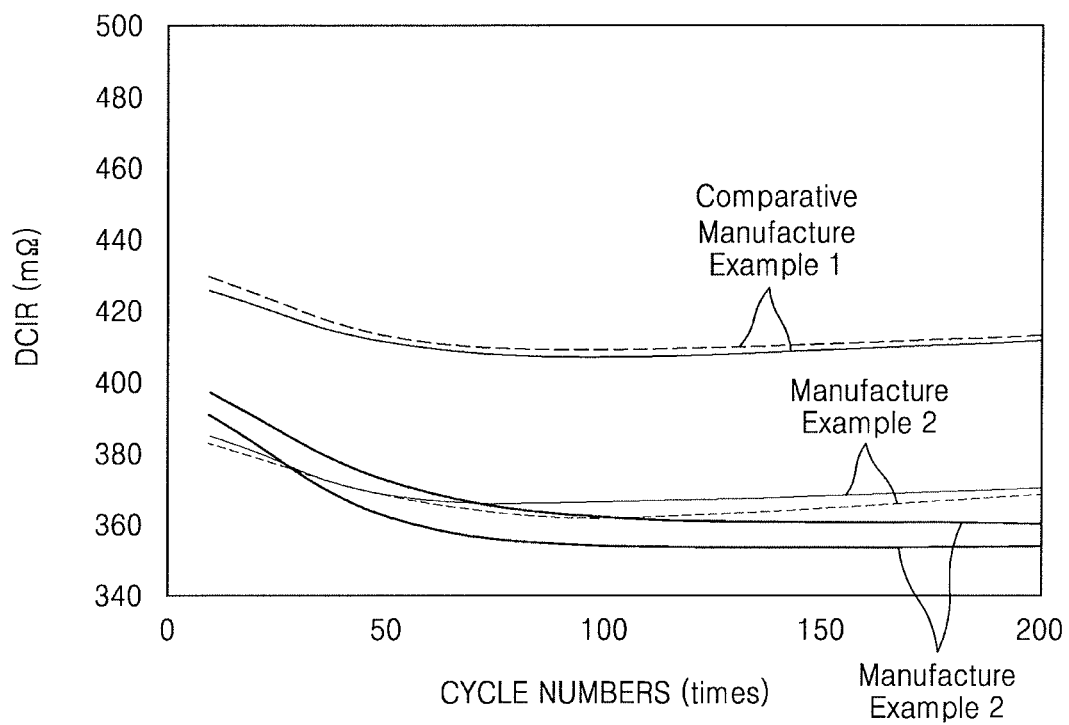
FIG. 7 illustrates direct current resistances of the coin cells prepared in Manufacture Examples 1 and 2 and Comparative Manufacture Example 1 at 25° C.

The evaluation results of the direct current resistances are shown in FIG. 7.

Referring to FIG. 7, it may be determined that conductivities at room temperature improved as the direct current resistances of the coin cells manufactured in Manufacture Examples 1 and 2 decreased at room temperature compared to that of the coin cell manufactured in Comparative Manufacture Example 1.

Evaluation Example 5: Direct Current Resistance (DCIR) at High Temperature (60° C.)

Direct current resistances of the coin cells manufactured in Manufacture Examples 1 and 2 and Comparative Manufacture Example 1 at a high temperature (60° C.) were evaluated.

Figure 8:
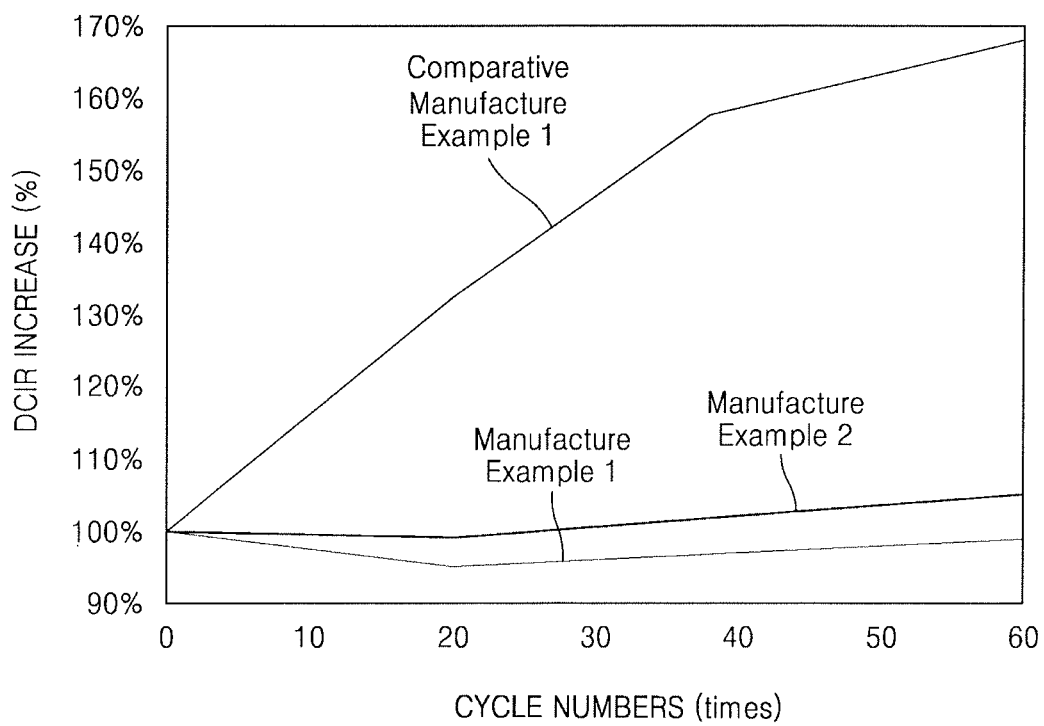
FIG. 8 illustrates direct current resistances of the coin cells prepared in Manufacture Examples 1 and 2 and Comparative Manufacture Example 1 at 60° C.

The evaluation results of the direct current resistances are shown in FIG. 8.

Referring to FIG. 8, it may be determined that conductivities at a high temperature improved as the direct current resistances of the coin cells manufactured in Manufacture Examples 1 and 2 decreased at a high temperature compared to that of the coin cell manufactured in Comparative Manufacture Example 1.

By way of summation and review, lithium secondary batteries have been recently used for high-output purposes in industries such as in electrical vehicles. For the lithium secondary battery to be used for such purposes, a high output performance is desirable as well as a high capacity and a high energy density.

In order to realize good output performance while having a high capacity and a high energy density, an electrode for a lithium secondary battery may be prepared in the form of a highly-dense thick film electrode. However, when the highly-dense thick film electrode is used, an air gap within the electrode per the same volume may be reduced, and a length of an ion pathway may be extended, which may lead to an increase in resistance. Thus, the highly-dense thick film may not be sufficient in its ion conductivity.

Also, a lithium secondary battery for an electric vehicle or for an electric power storage may be exposed to a high temperature environment. A temperature of the battery may increase due to an instant charging/discharging, and in the high-temperature environment, the lifespan of a battery may be reduced, and an amount of stored energy may decrease. Therefore, in order to use a lithium secondary battery in a field such as electric vehicles, it is desirable that the lithium secondary battery have excellent stability and cycle characteristics at a high temperature.

Embodiments provide an electrolyte for a lithium battery. A lithium battery including the electrolyte exhibits improved output characteristics and high-temperature characteristics.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. An electrolyte for a lithium battery, the electrolyte comprising:
   an organic solvent; and
   a compound represented by Formula 1:

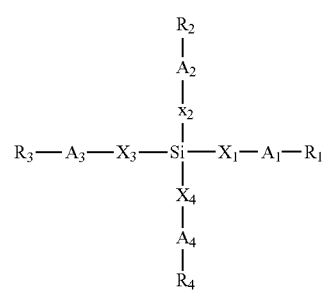

[Formula 1]

wherein, in Formula 1, $X_1$ to $X_4$ are each independently oxygen (O) or nitrogen (N), $A_1$ to $A_4$ each independently denote a chemical bond, an unsubstituted or substituted C1-C10 alkylene group, an unsubstituted or substituted C6-C10 arylene group, an unsubstituted or substituted C7-C10 arylalkylene group, an unsubstituted or substituted C2-C10 heteroarylene group, an unsubstituted or substituted C3-C10 heteroarylalkylene group, or an unsubstituted or substituted C4-C10 carbocyclic group, wherein at least one of $A_1$ to $A_4$ is $(CH_2)_a$, where a is independently 2 to 4 at least one of $R_1$ to $R_4$ is $-C(R_5)=Y_1$, where $Y_1$ is $C(R_6)(R_7)$, and $R_5$ to $R_7$ are each independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom, and the remaining $R_1$ to $R_4$ are each independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom.

2. The electrolyte as claimed in claim 1, wherein $X_1$ to $X_4$ are all oxygen (O).

3. The electrolyte as claimed in claim 1, wherein the compound represented by Formula 1 is a compound represented by Formula 2:

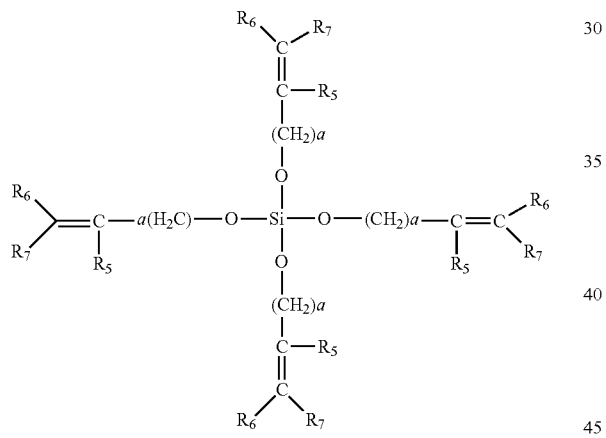

[Formula 2]

wherein, in Formula 2, a is independently from 2 to 4, and $R_5$ to $R_7$ are each independently a hydrogen, a C1-C10 alkyl group, a C1-C10 alkoxy group, a C6-C10 aryl group, a C7-C10 arylalkyl group, a C6-C10 aryloxy group, a C2-C10 heteroaryl group, a C3-C10 heteroarylalkyl group, a C2-C10 heteroaryloxy group, a C4-C10 carbocyclic group, or a halogen atom.

4. An electrolyte for a lithium battery, the electrolyte comprising:

an organic solvent; and a compound selected from compounds represented by Formulae 6 to 8:

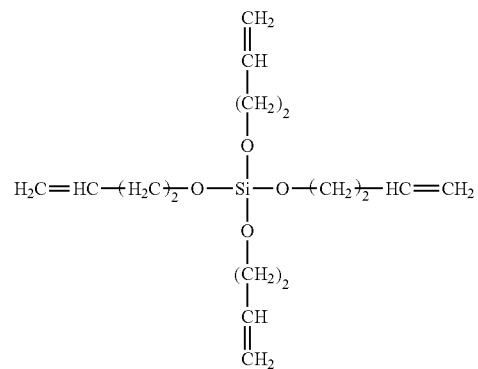

[Formula 6]

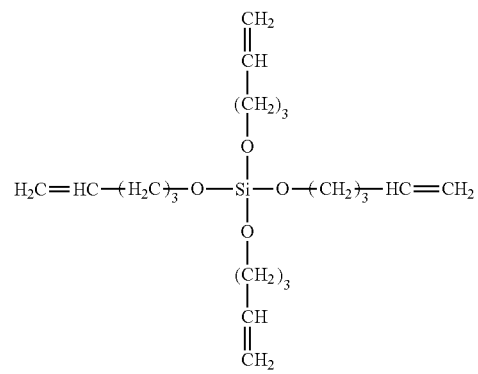

[Formula 7]

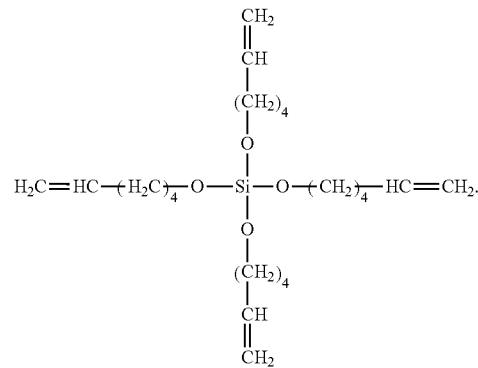

[Formula 8]

5. The electrolyte as claimed in claim 1, wherein the compound represented by Formula 1 is present in a range of about 0.01 wt % to about 10 wt % based on a total weight of the electrolyte.

6. The electrolyte as claimed in claim 1, wherein the organic solvent includes one or more of a carbonate-based compound, an ester-based compound, an ether-based compound, a ketone-based compound, an alcohol-based compound, or an aprotic solvent.

7. The electrolyte as claimed in claim 1, further comprising a lithium salt.

8. The electrolyte as claimed in claim 1, wherein the organic solvent includes about 20 vol % to about 80 vol % of a cyclic carbonate compound and about 20 vol % to about 70 vol % of a chain carbonate compound.

9. A lithium battery, comprising:
a cathode;
an anode; and
at least one selected from the electrolyte as claimed in claim 1 and a reaction product of the electrolyte as claimed in claim 1.

10. The lithium battery as claimed in claim 9, wherein the lithium battery operates in a voltage range of about 2.8 V to about 4.3 V.

11. The electrolyte as claimed in claim 4, wherein the compound selected from compounds represented by Formulae 5 to 8 is present in a range of about 0.01 wt % to about 10 wt % based on a total weight of the electrolyte.

12. The electrolyte as claimed in claim 4, wherein the organic solvent includes one or more of a carbonate-based compound, an ester-based compound, an ether-based compound, a ketone-based compound, an alcohol-based compound, or an aprotic solvent.

13. The electrolyte as claimed in claim 4, further comprising a lithium salt.

14. The electrolyte as claimed in claim 4, wherein the organic solvent includes about 20 vol % to about 80 vol % of a cyclic carbonate compound and about 20 vol % to about 70 vol % of a chain carbonate compound.

15. A lithium battery, comprising:
a cathode;
an anode; and
at least one selected from the electrolyte as claimed in claim 4 and a reaction product of the electrolyte as claimed in claim 4.

16. The lithium battery as claimed in claim 15, wherein the lithium battery operates in a voltage range of about 2.8 V to about 4.3 V.

17. A lithium battery, comprising:
a cathode; an anode; and an electrolyte including a compound represented by Formula 5,
wherein the compound represented by Formula 5 is present in a range of about 1 wt % to about 10 wt % based on a total weight of the electrolyte, the organic solvent includes about 20 vol % to about 80 vol % of a cyclic carbonate compound and about 20 vol % to about 70 vol % of a chain carbonate compound, and the lithium battery has a direct current resistance (DCIR) increase at a temperature of 60° C. of less than 110% after 60 cycles of charging and discharging cycles

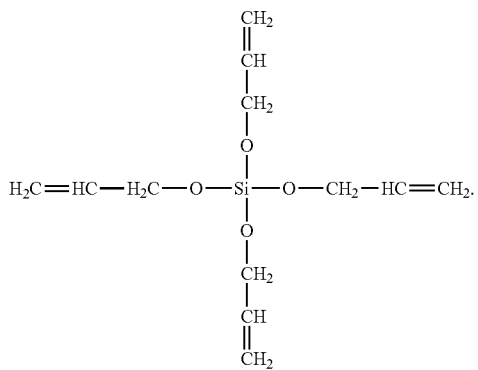

Formula 5

18. The lithium battery of claim 17, wherein the lithium battery has a capacity retention rate at a temperature of 60° C. of more than 80% after 60 cycles of charging and discharging cycles.

19. The lithium battery of claim 17, wherein the cyclic carbonate compound is a mixture of ethylene carbonate and propylene carbonate, and the chain carbonate compound is diethyl carbonate, and the amount of the cyclic carbonate is larger than the amount of the chain carbonate.

20. The lithium battery of claim 17, wherein the amount of the compound represented by Formula 5 is in a range of about 1 wt % to about 3 wt % based on a total weight of the electrolyte.

* * * * *